(12) United States Patent
Kouwa (10) Patent No.: US 8,125,195 B2
(45) Date of Patent: Feb. 28, 2012

(54) CONTROL APPARATUS FOR IN-VEHICLE AC GENERATOR

(75) Inventor: Tatsuki Kouwa, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 827 days.

(21) Appl. No.: 12/188,715

(22) Filed: Aug. 8, 2008

(65) Prior Publication Data

US 2009/0206801 A1    Aug. 20, 2009

(30) Foreign Application Priority Data

Feb. 15, 2008   (JP) ................................. 2008-034632

(51) Int. Cl.
*H02P 9/00*      (2006.01)
(52) U.S. Cl. .............................. 322/28; 322/24; 322/44
(58) Field of Classification Search ........................ None
See application file for complete search history.

(56) References Cited

U.S. PATENT DOCUMENTS

| 6,700,355 | B2 * | 3/2004 | Aoyama et al. | 322/36 |
| 7,102,332 | B1 * | 9/2006 | Sasaki et al. | 322/28 |
| 7,224,144 | B2 * | 5/2007 | Inokuchi et al. | 322/24 |
| 7,235,952 | B2 * | 6/2007 | Maehara | 322/24 |
| 7,285,937 | B2 * | 10/2007 | Asada | 322/24 |

FOREIGN PATENT DOCUMENTS

| JP | 1-218333 A | 8/1989 |
| JP | 6-113599 A | 4/1994 |

\* cited by examiner

*Primary Examiner* — Quyen Leung
*Assistant Examiner* — Thomas Truong
(74) *Attorney, Agent, or Firm* — Sughrue Mion, PLLC (57) ABSTRACT

Power-generation control operation for an in-vehicle electric generator is further stabilized in such a way that, in the case where a signal at an external-control-signal input terminal changes, a function of on/off-controlling a magnetic-field current in a constant cycle is interrupted. In a control apparatus, for an in-vehicle electric generator, that has a function of adjusting a generation voltage to a predetermined voltage, by on/off-controlling a magnetic-field current in a constant cycle, and variably controlling an adjustment voltage, based on an input signal from an external control unit, in the case where a signal at an external-control-signal input terminal is fixed for a long time, the function of on/off-controlling the magnetic-field current in the constant cycle is activated, and in the case where the signal at the external-control-signal input terminal changes, the function of on/off-controlling the magnetic-field current in the constant cycle is interrupted.

5 Claims, 6 Drawing Sheets

CONTROL APPARATUS FOR IN-VEHICLE AC GENERATOR

BACKGROUND OF THE INVENTION

1. Field of the Invention

The present invention relates to a control apparatus, for an in-vehicle AC generator, that on/off-controls a magnetic-field current in a constant cycle so as to adjust a generation voltage to a predetermined voltage.

2. Description of the Related Art

As a conventional control apparatus of this kind, a control apparatus is known (refer to Japanese Patent Laid-Open No. 1989-218333) in which the operation of a power transistor that controls a magnetic-field current through on/off operation is held by a holding circuit, and the holding state is released by a constant-cycle trigger pulse from a trigger-pulse generator.

In addition, a control apparatus is also known (refer to Japanese Patent Laid-Open No. 1994-113599) in which an adjustment voltage is controlled by an external control signal so that the power-generation amount of an electric generator is variably controlled.

Figure 7:
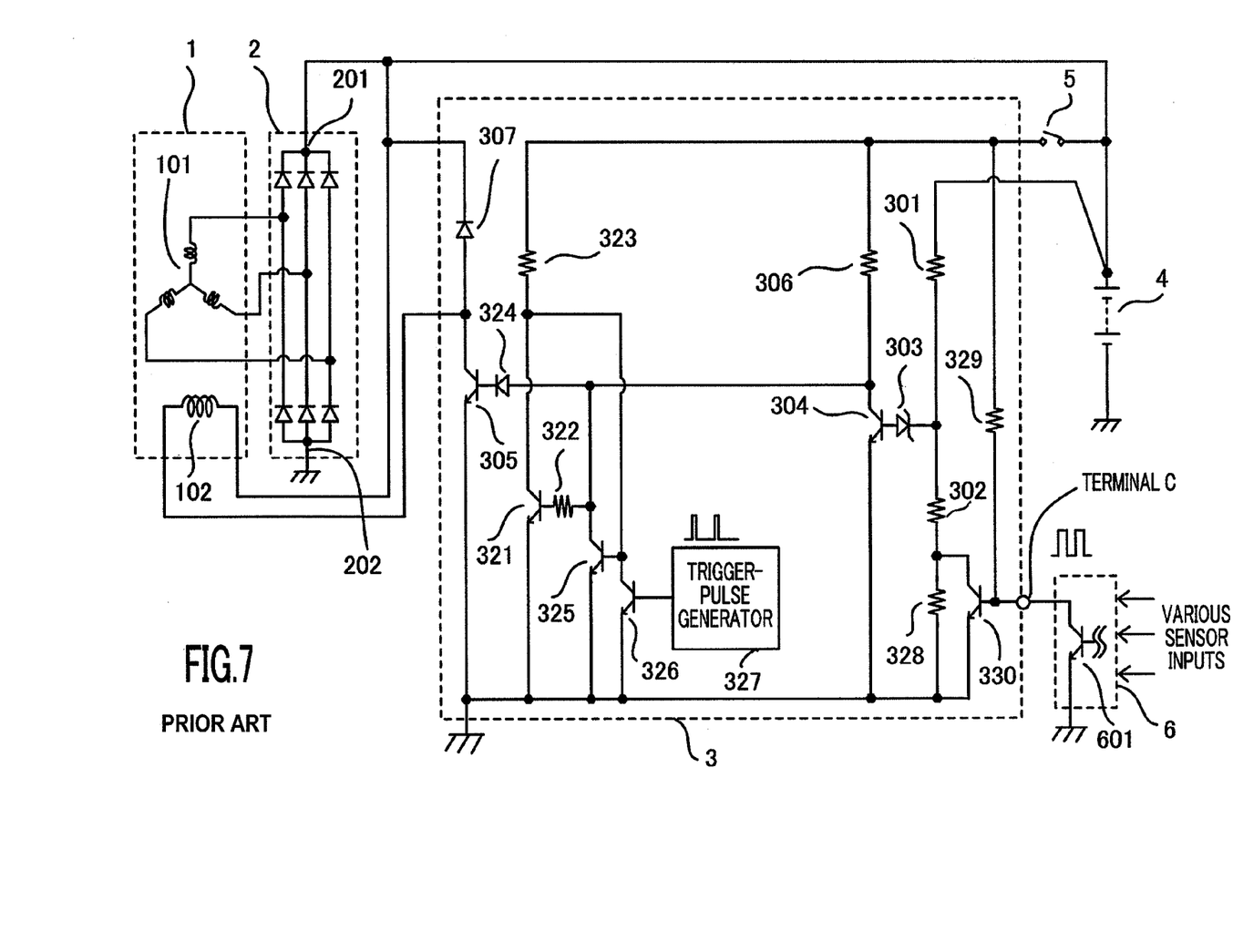
FIG. 7 is an overall circuit diagram illustrating a conventional control apparatus for an in-vehicle electric generator.

FIG. 7 is a circuit diagram illustrating a control apparatus that has a function, disclosed in Japanese Patent Laid-Open No. 1989-218333, for controlling a magnetic-field current by an inherent-cycle trigger pulse and a function, disclosed in Japanese Patent Laid-Open No. 1994-113599, for variably controlling the power-generation amount of an electric generator by an external control signal; in FIG. 7, reference numeral 1 denotes an AC generator that has an armature coil 101 and a magnetic-field coil 102. Reference numeral 2 denotes a rectifier that has an output terminal 201 and a grounding terminal 202. Additionally, reference numeral 3 denotes a control apparatus (referred to also as a voltage adjuster); voltage-detection voltage-dividing resistors 301, 302, and 328 for detecting the voltage of the output terminal 201 are connected between the output terminal 201 and the grounding terminal 202.

The connection point between the voltage-dividing resistor 301 and the voltage-dividing resistor 302 is connected to the base of a control transistor 304 by the intermediary of a zener diode 303. The output voltage of the AC generator 1 is detected by the voltage-detection voltage-dividing resistors 301 and 302 and the zener diode 303; the control transistor 304 is turned on or off as the zener diode 303 becomes conductive or nonconductive, respectively. The emitter of the control transistor 304 is earthed; the collector of the transistor 304 is connected to a battery 4 by the intermediary of a resistor 306 and a key switch 5 and to the base of a power transistor 305 by the intermediary of a diode 324.

The conductivity of the power transistor 305 is controlled as the control transistor 304 is turned on or off, whereby the magnetic-field current in the magnetic-field coil 102 is controlled; the collector of the power transistor 305 is connected to one terminal of the magnetic-field coil 102 and the emitter thereof is earthed. The collector of the power transistor 305 is connected also to the output terminal 201 by the intermediary of a suppression diode 307; the suppression diode 307 is connected in parallel with the magnetic-field coil 102 so as to absorb an on/off surge produced across the magnetic-field coil 102.

Furthermore, the control apparatus is provided with a transistor 325 whose collector is connected to the collector of the control transistor 304 and whose emitter is earthed and that forms a holding circuit; a voltage-dividing circuit, consisting of a transistor 321 and a resistor 323, which feeds to the base of the transistor 325 a signal for maintaining holding operation of the transistor 325; and a trigger-pulse generator 327 and a transistor 326 that feed to the base of the transistor 325 a signal for releasing the holding operation of the transistor 325.

Meanwhile, from an external control unit 6 that is mounted in a vehicle and receives various kinds of sensor inputs, a signal is inputted to an external-control-signal input terminal C of the control apparatus 3; a transistor 330, which is turned on or off as the foregoing signal exists or not, is connected across the voltage-dividing resistor 328.

Next, the operation of the foregoing circuit will be explained. When, upon the activation of an unillustrated engine, the key switch 5 is closed, a base current is supplied from the battery 4 to the power transistor 305, by way of the key switch 5, the resistor 306, and the diode 324, so that the power transistor 305 is turned on; thus, a magnetic-field current flows in the magnetic-field coil 102, whereby the electric power generator 1 becomes capable of generating electric power.

Next, when the engine is activated, the generator 1 starts generation of electric power, and then the voltage of the output terminal 201 of the rectifier 2 rises. In the case where, at the external-control-signal input terminal C of the control apparatus 3, there exists no signal input from the external control unit 6, whereby the electric potential of the external-control-signal input terminal C is held to be "Hi" (in the case where the transistor 601 is in the nonconductive state), a base current is supplied to the transistor 330 by way of the resistor 329, whereby the resistor 328 is short-circuited as the transistor 330 turns on, and the connection point between the resistor 328 and the resistor 302 is earthed.

In this situation, when the voltage of the output terminal 201 of the rectifier 2 exceeds a predetermined value set with the voltage-detection voltage-dividing resistors 301 and 302 and the zener diode 303, the zener diode 303 turns on, and then the control transistor 304 turns on. Accordingly, the potential of the base of the power transistor 305 becomes the ground potential, whereby the power transistor 305 is turned off; therefore, the magnetic-field current flowing in the magnetic-field coil 102 is reduced, whereby the output voltage of the electric power generator 1 decreases. At this time, because sharing the same base potential with the transistor 305, the transistor 321 is turned off in synchronization with the transistor 305; as a result, due to the voltage produced at the connection point between the resistor 323 and the transistor 321, the transistor 325 is maintained to be conductive.

Next, when the output voltage of the electric power generator 1 decreases to be less than a predetermined value set with the resistors 301 and 302 and the zener diode 302, the zener diode 303 turns off, and then control is performed in such a way as to turn the transistor 305 on. However, as described above, because the transistor 325 is maintained to be conductive, the transistor 321 that operates in the same phase with the transistor 325 is in the nonconductive state; therefore, the power transistor 305 does not immediately turns on.

In order to resolve this condition, a constant-cycle trigger pulse is outputted from the trigger-pulse generator 327, and when the trigger pulse turns the transistor 326 on, the transistor 325 is turned off. That is to say, the trigger pulse finally resolves the condition in which the transistor 325 is maintained to be conductive, whereby the transistor 305 turns on.

In accordance with the foregoing operation, the power transistor 305 of the control apparatus 3 alternately turns on and turns off in a constant cycle, based on the cycle of the trigger pulse generated by the trigger-pulse generator 327, so that the output voltage of the electric power generator 1 is controlled so as to be a first adjustment voltage VHi.

Additionally, in the case where the transistor 601 in the external control unit 6 turns on, whereby the external-control-signal input terminal C of the control apparatus is earthed (connected to the ground with a potential "Lo")), the transistor 330 is turned off, so that the adjustment voltage is controlled so as to be a value set with the voltage-detection voltage-dividing resistors 301, 302, and 328 and the zener diode 303; therefore, the output voltage of the electric power generator 1 can be controlled with a second adjustment voltage VLo that is lower than the adjustment voltage applied when the electric potential of the external-control-signal input terminal C is "Hi".

In the conventional control apparatus, for an in-vehicle electric generator, configured as described above, in the case where the signal at the external-control-signal input terminal is fixed to be "Hi" or "Lo" for a long time, the transistor for on/off-controlling the magnetic-field coil can repeat the operation in an inherent constant cycle of the control apparatus so as to perform stable control; however, in the case where, while the signal at the external-control-signal input terminal alternately becomes "Hi" and "Lo", the control operation is performed, the timing when the trigger-pulse generator generates a trigger pulse so as to turn the power transistor 305 on overlaps, depending on the operation timing, with the timing when the power transistor 305 is turned off by a signal from the external control unit; in this case, there has been a problem that the power transistor cannot be turned on at predetermined timings.

Figure 8:
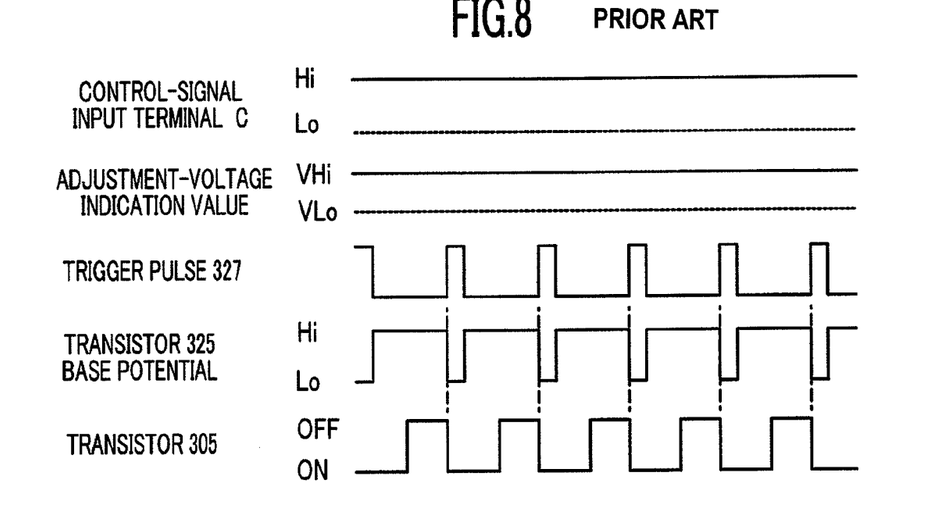
FIG. 8 is a chart representing operation waveforms at various points in a conventional apparatus, in the case where a signal at an external-control-signal input terminal is fixed for a long time.
Figure 9:
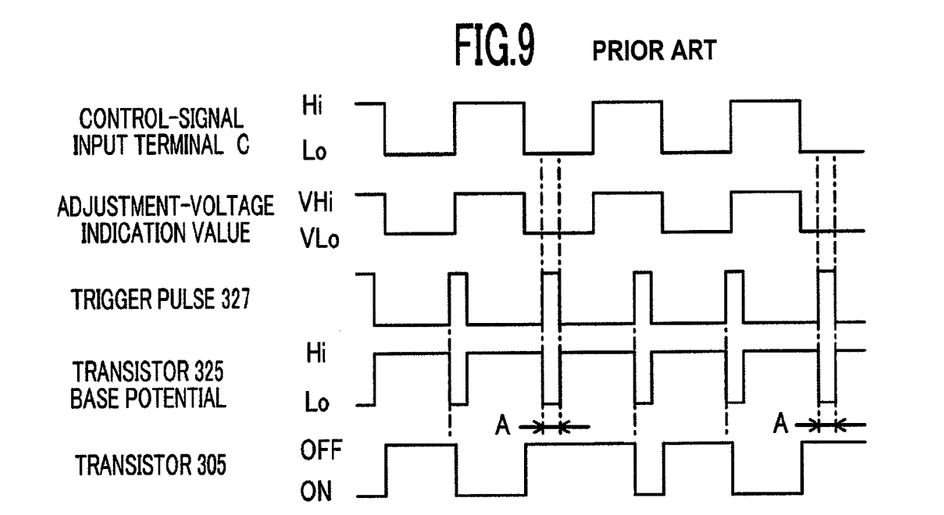
FIG. 9 is a chart representing operation waveforms at various points in a conventional apparatus, in the case where a signal at an external-control-signal input terminal intermittently and recurrently changes.

FIGS. 8 and 9 are charts, each representing operation waveforms at various points, for explaining the foregoing problem; FIG. 8 is a chart representing waveforms in the case where the signal at the external-control-signal input terminal is fixed to be "Hi" or "Lo" for a long time; FIG. 9 is a chart representing waveforms in the case where, while the signal at the external-control-signal input terminal alternately becomes "Hi" and "Lo", the control operation is performed. In the case of FIG. 8, because the signal at the external-control-signal input terminal is fixed to be "Hi" or "Lo" for a long time, the power transistor 305 stably operates in synchronization with a trigger pulse from the trigger-pulse generator 327.

However, in the case of FIG. 9, the signal at the external-control-signal input terminal alternately becomes "Hi" and "Lo"; therefore, in the case where the timing when the external control unit makes the electric potential of the terminal C change to "Lo" so that the adjustment-voltage indication value is reduced to "VLo" and then the power transistor 305 is turned off completely overlaps, as in the portion A, with a trigger pulse from the trigger-pulse generator 327, a case is also caused in which the power transistor 305 cannot turn on at a predetermined timing and operates unstably, whereby the power-generation amount becomes insufficient.

SUMMARY OF THE INVENTION

The present invention has been implemented in consideration of the foregoing problems; the objective of the present invention is to further stabilize the generation-control operation for an in-vehicle electric generator in such a way that, in the case where a signal at the external-control-signal input terminal is fixed for a long time, a function of on/off-controlling the magnetic-field current in a constant cycle is activated, and in the case where the signal at the external-control-signal input terminal changes, the function of on/off-controlling the magnetic-field current in the constant cycle is interrupted.

A control apparatus for an in-vehicle electric generator, according to the present invention, has a function of adjusting a generation voltage to a predetermined voltage, by on/off-controlling a magnetic-field current in a constant cycle, and variably controlling an adjustment voltage based on an input signal from an external control unit; the control apparatus is characterized in that, in the case where a signal at an external-control-signal input terminal is fixed for a long time, the function of on/off-controlling the magnetic-field current in the constant cycle is activated, and in the case where the signal at the external-control-signal input terminal changes, the function of on/off-controlling the magnetic-field current in the constant cycle is interrupted.

In a control apparatus for an in-vehicle electric generator, according to the present invention, in the case where the signal at the external control terminal is fixed to be either "Hi" or "Lo", the control is performed in such a way that, the on/off-control frequency for the magnetic-field coil is an inherent constant cycle of the electric-generation control apparatus, and in the case where the signal at the external-control-signal input terminal intermittently and recurrently changes, stable electric-generation control, which is in synchronization with the control signal, can also be performed; therefore, the electric-generation control stabilizes, whereby electric generation can securely be prevented from being insufficient. Moreover, even in the case where an abnormality occurs at the external control terminal, stable control can be performed through a trigger pulse from a trigger-pulse generator 327.

The foregoing and other object, features, aspects, and advantages of the present invention will become more apparent from the following detailed description of the present invention when taken in conjunction with the accompanying drawings.

DETAILED DESCRIPTION OF THE PREFERRED EMBODIMENTS

Embodiment 1

Figure 1:
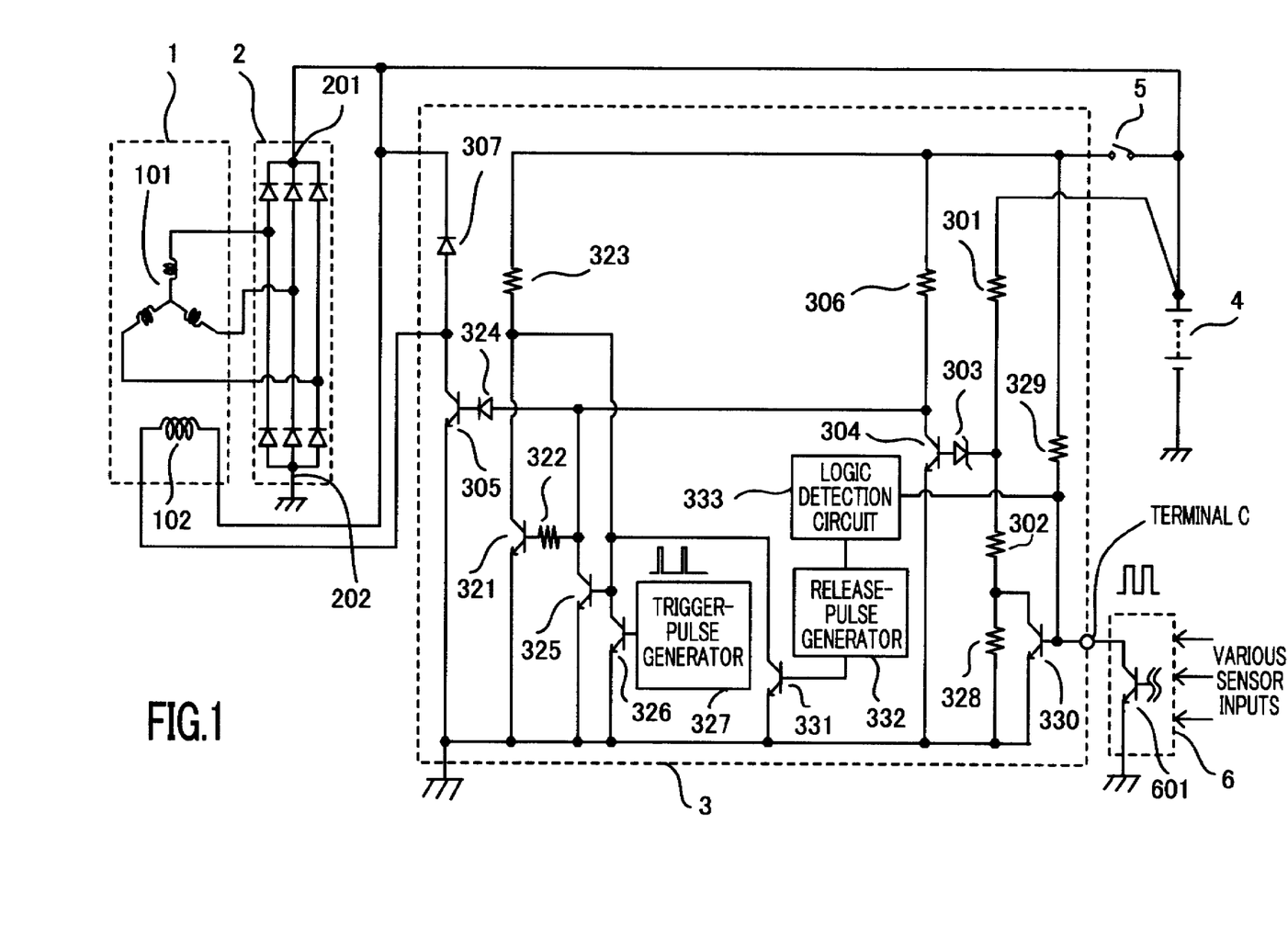
FIG. 1 is an overall circuit diagram illustrating a control apparatus, for an in-vehicle electric generator, according to Embodiment 1 of the present invention.

FIG. 1 is a circuit diagram illustrating a configuration according to Embodiment 1; the same or equivalent constituent elements as those in FIG. 7 are designated by the same reference characters. In order to avoid overlap, the constituent elements that have been explained with reference to FIG. 7 will be omitted, and newly added configurations will mainly be explained. That is to say, Embodiment 1 is provided with a function of interrupting fixed-frequency control for a predetermined time in the case where the electric potential of the signal at the external-control-signal input terminal C changes from "Hi" to "Lo"; for that purpose, a logic detection circuit 333 that detects the state of the signal at the external-control-signal input terminal C, a release-pulse generation circuit 332, and a transistor 331 are added.

Specifically, the logic detection circuit 333 that detects the logic status of an input signal from the external control unit 6 is connected to the external-control-signal input terminal C, and provision is made for the release-pulse generator 332 that, in response to the detection output of the logic detection circuit 333, turns on the transistor 331 inserted in parallel with the transistor 326 so as to release the conductivity holding state of the transistor 325. In addition, as the logic detection circuit 333, any circuit may be utilized, as long as it detects a change in the electric potential of the external-control-signal input terminal C, and, as the release-pulse generator 332, any circuit may be utilized, as long as it turns on the transistor 331 in response to a change in the output of the logic detection circuit 333; therefore, because both the logic detection circuit 333 and the release-pulse generator 332 can readily be configured with publicly known circuits, detailed explanations therefor will be omitted.

Figure 2:
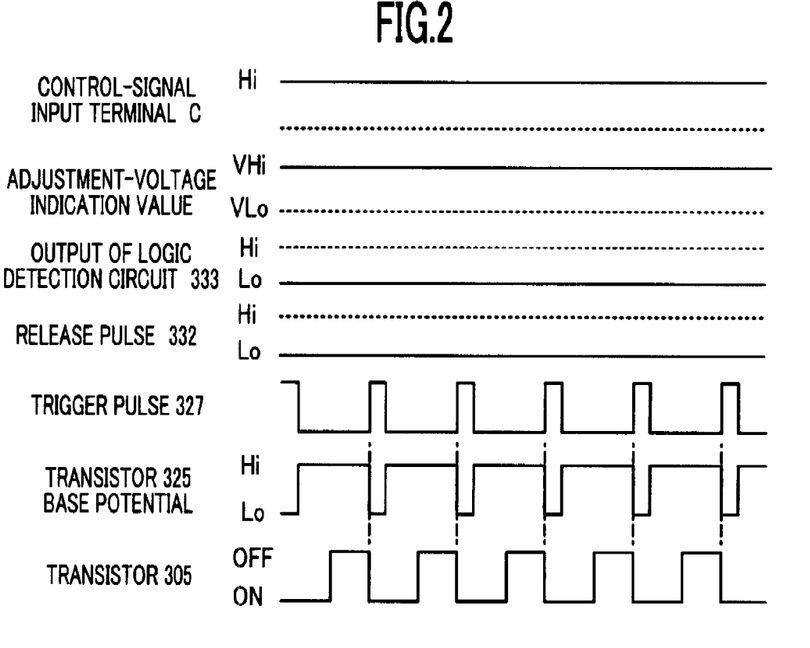
FIG. 2 is a chart representing operation waveforms at various points, according to Embodiment 1 of the present invention, in the case where a signal at an external-control-signal input terminal is fixed for a long time.
Figure 3:
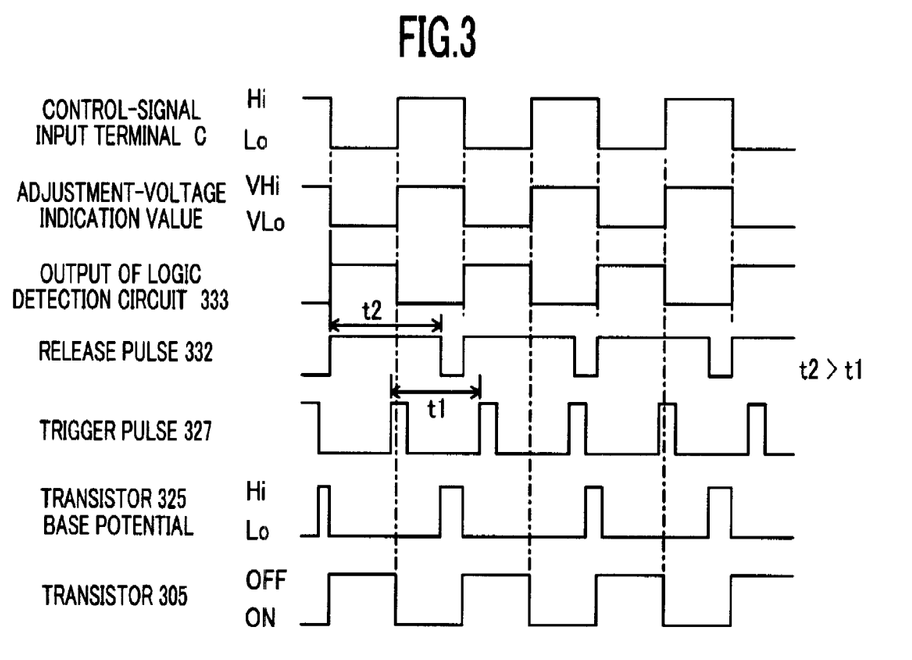
FIG. 3 is a chart representing operation waveforms at various points, according to Embodiment 1 of the present invention, in the case where a signal at an external-control-signal input terminal intermittently and recurrently changes.

FIGS. 2 and 3 are charts each representing operation waveforms at various points in a circuit configuration according to Embodiment 1; FIGS. 2 and 3 correspond to FIGS. 8 and 9, respectively. In other words, in the case where the state of the external-control-signal input terminal C is fixed to be "Hi" or "Lo" for a long time, because, as represented in FIG. 2, the state of the output of the logic detection circuit 333 is "Lo", there exists no output from the release-pulse generator 332; thus, the transistor 331 maintains the cut-off state and, as is the case with FIG. 7, performs stable control based on a constant-frequency trigger pulse from the trigger-pulse generator 327.

Next, in the case where the external control unit 6 makes the state of the signal at the external-control-signal input terminal C change from "Hi" potential to "Lo" potential, the transistor 330 is turned off, whereby, as represented in FIG. 3, the adjustment-voltage indication value at the connection point between the voltage-dividing resistors 301 and 302 is reduced to VLo, and the logic detection circuit 333 detects the change in the electric potential of the external-control-signal input terminal C and then changes the state of its output to "Hi". As a result, the release-pulse generation circuit 332 generates a release pulse having a predetermined duration during which the transistor 331 is in the conductive state.

While the transistor 331 is in the conductive state, the base of the transistor 325 is earthed, whereby the holding function of the transistor 325 is cancelled; therefore, the power transistor 305 that has been held in the cut-off state is ready to turn on, regardless of the occurrence of the trigger pulse. In this condition, at the timing when the zener diode 303 turns on, the power transistor 305 is turned on.

Additionally, as described above, after the magnetic-field-current on/off control function is interrupted in the inherent constant cycle of the control apparatus, based on the change in the signal at the external-control-signal input terminal, the on/off control with the inherent constant cycle of the control apparatus is resumed, in the case where there exists no change in the external control signal for a predetermined time. In addition, as represented in FIG. 3, the duration t2 of the release pulse generated by the release-pulse generator 332 is set to be longer than the cycle t1 of the trigger pulse so that the holding function of the transistor 325 can effectively be cancelled, whereby a stable generation control state can be obtained.

Embodiment 2

Figure 4:
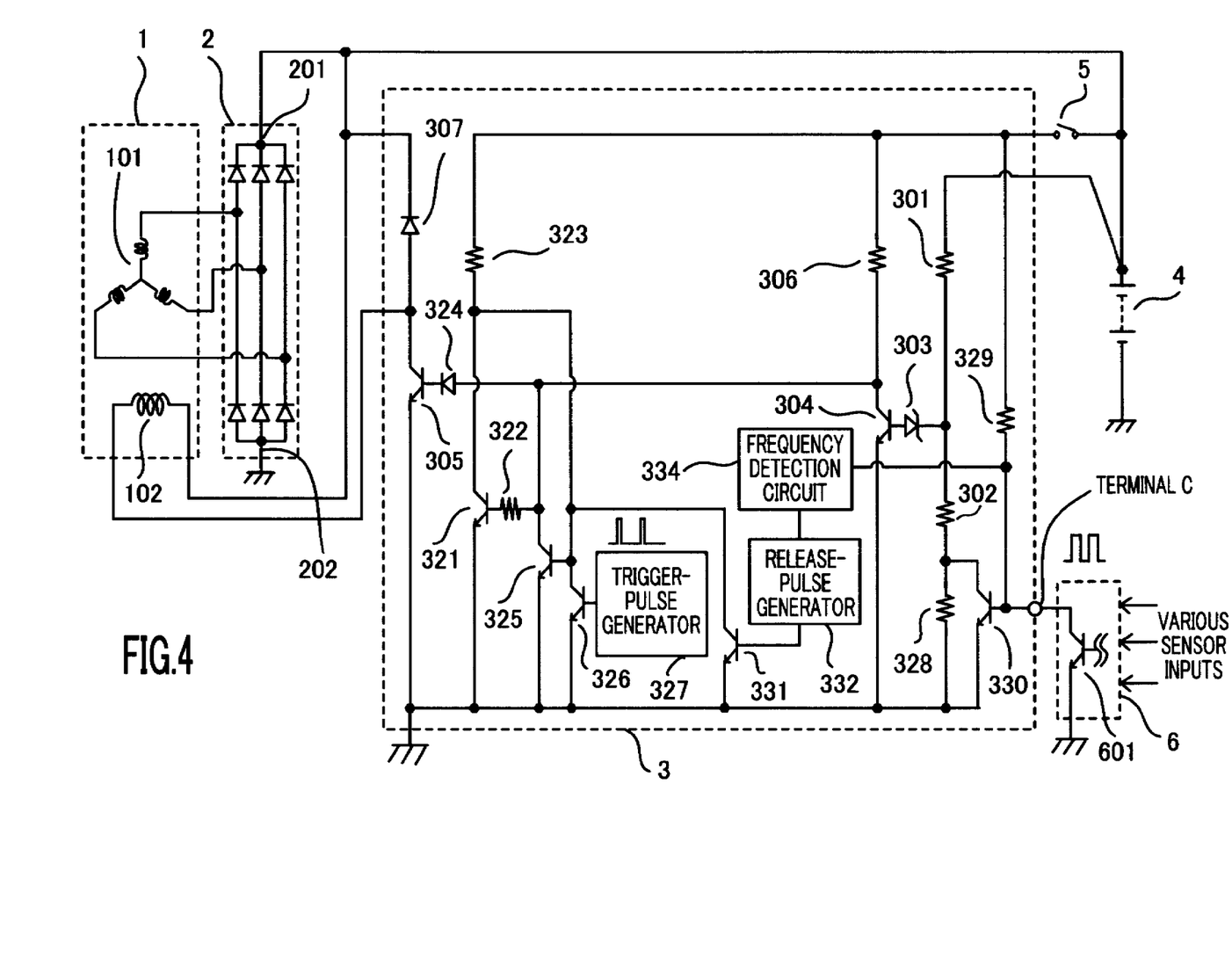
FIG. 4 is an overall circuit diagram illustrating a control apparatus, for an in-vehicle electric generator, according to Embodiment 2 of the present invention.

FIG. 4 is a circuit diagram illustrating a configuration according to Embodiment 2; the same or equivalent constituent elements as those in FIG. 8 are designated by the same reference characters. Embodiment 2 is provided with a function of detecting the frequency at the external-control-signal input terminal C and, in the case where the frequency is higher than a predetermined value, cancelling fixed-frequency control; the function is configured with a frequency detection circuit 334 that detects the frequency at the external-control-signal input terminal C, a release-pulse generation circuit 332, and a transistor 331.

Specifically, the frequency detection circuit 334 that detects the frequency of an input signal from the external control unit 6 is connected to the external-control-signal input terminal C, and provision is made for the release-pulse generator 332 that, in response to the detection output of the frequency detection circuit 334, turns on the transistor 331 inserted in parallel with the transistor 326 so as to release the conductivity holding state of the transistor 325. In addition, as the frequency detection circuit 334, any circuit maybe utilized, as long as it detects the change in the frequency of the external control signal, and as the release-pulse generator 332, any circuit may be utilized, as long as it turns on the transistor 331 in response to a change in the output of the frequency detection circuit 334; therefore, because both the frequency detection circuit 334 and the release-pulse generator 332 can readily be configured with publicly known circuits, detailed explanations therefor will be omitted.

Figure 5:
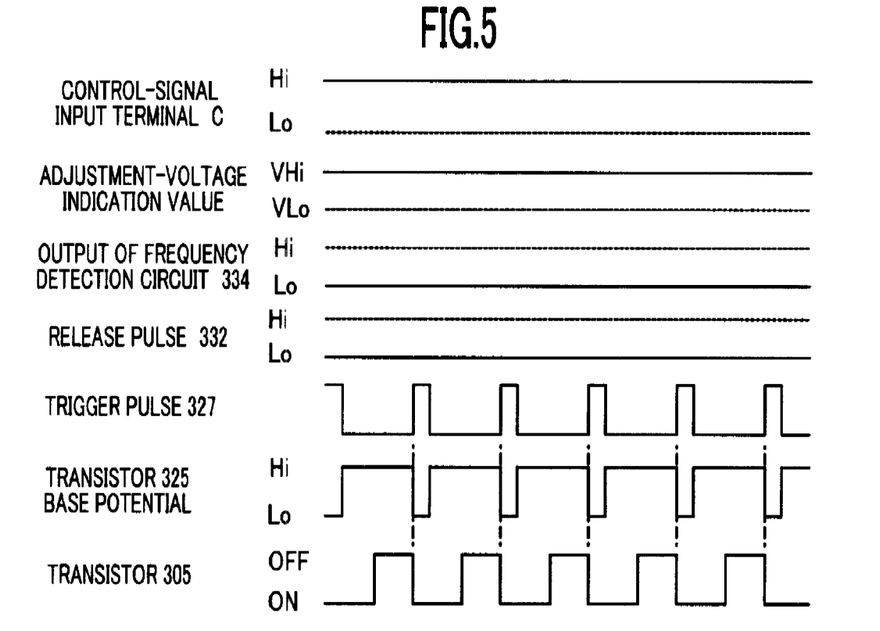
FIG. 5 is a chart representing operation waveforms at various points, according to Embodiment 2 of the present invention, in the case where a signal at an external-control-signal input terminal is fixed for a long time.
Figure 6:
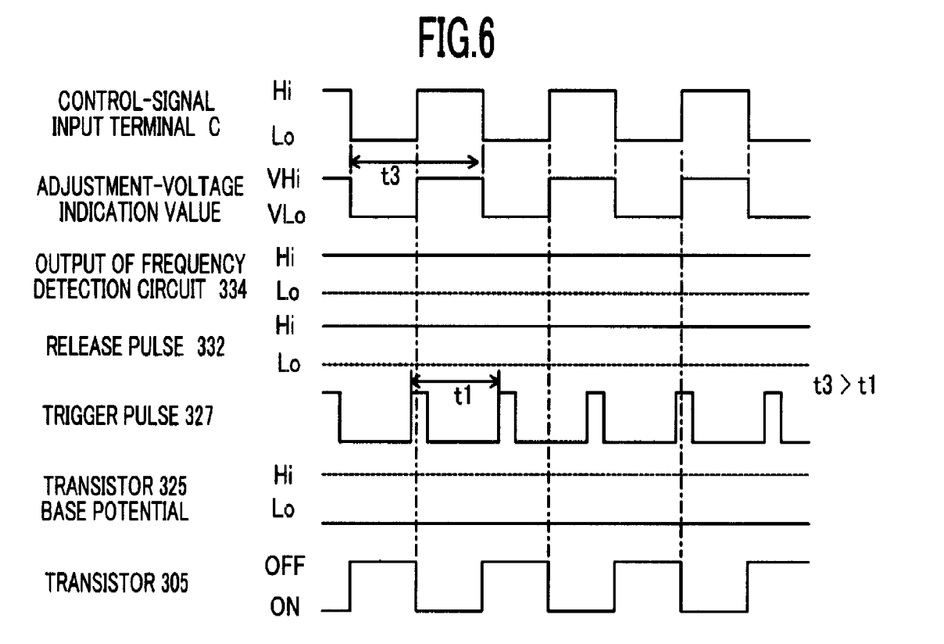
FIG. 6 is a chart representing operation waveforms at various points, according to Embodiment 2 of the present invention, in the case where a signal at an external-control-signal input terminal intermittently and recurrently changes.

FIGS. 5 and 6 are charts each representing operation waveforms at various points in a circuit configuration according to Embodiment 2; FIGS. 5 and 6 correspond to FIGS. 2 and 3, respectively. That is to say, in the case where the state of the signal of the external-control-signal input terminal C is fixed to be "Hi" or "Lo" for a long time, because, as represented in FIG. 5, the state of the output of the frequency detection circuit 334 is "Lo", there exists no output from the release-pulse generator 332; thus the transistor 331 maintains the cut-off state and, as is the case with FIG. 2, performs stable control based on a trigger pulse from the trigger-pulse generator 327.

Next, in the case where the input signal of the external-control-signal input terminal C is controlled in such a way as to become "Hi" and "Lo" alternately and recurrently, the frequency detection circuit 334 detects a variable frequency at the external-control-signal input terminal C, as represented in FIG. 6, and in the case where the frequency is higher than a predetermined value, the state of the output of the frequency detection circuit 334 is changed to "Hi" so that the release-pulse generation circuit 332 generates a predetermined release signal; while the predetermined release signal is generated, the transistor 331 is in the conductive state.

As a result, while the transistor 331 is in the conductive state, the base of the transistor 325 is earthed, whereby the holding function of the transistor 325 is cancelled; therefore, the transistor 305 that has been held in the cut-off state becomes ready to turn on, without waiting for the occurrence of the trigger pulse. In this condition, at the timing when the zener diode 303 turns on, the power transistor 305 is turned on.

Additionally, as described above, after the magnetic-field-current on/off control function is interrupted in the inherent constant cycle of the control apparatus, based on the change in the signal at the external-control-signal input terminal, the on/off control with the inherent constant cycle of the control apparatus is resumed, in the case where there exists no change in the external control signal for a predetermined time. In addition, as represented in FIG. 6, the detection threshold value t3 for the cycle of the signal, at the external-control-signal input terminal C, for generating the release pulse is set to be longer than the cycle t1 of the trigger pulse so that the release function effectively works, whereby a further stable generation control state can be obtained.

Various modifications and alterations of this invention will be apparent to those skilled in the art without departing from the scope and spirit of this invention, and it should be understood that this is not limited to the illustrative embodiments set forth herein.

What is claimed is:

1. A control apparatus for an in-vehicle electric generator configured to adjust a generation voltage to a predetermined voltage, by on/off-controlling a magnetic-field current in a constant cycle, and variably controlling an adjustment voltage, based on an input signal from an external control unit, comprising:
    a power transistor that is connected in series to a magnetic-field coil of the electric generator, the magnetic-field current being controlled through connection and disconnection of the power transistor;
    a control transistor that detects the adjustment voltage corresponding to an output voltage of the electric generator so as to control the conductivity of the power transistor;
    a holding circuit that holds the cut-off state of the power transistor;
    a trigger-pulse generator that continues and discontinues in a constant cycle the holding state held by the holding circuit; and
    a hold-release means for, when a signal from the external control unit changes, interrupting on/off-controlling of the magnetic-field current in the constant cycle.

2. The control apparatus for an in-vehicle electric generator, according to claim 1, wherein the hold-release means comprises:
    a logic detection circuit that detects a change in the signal at the external-control-signal input terminal; and
    a release-pulse generation circuit that releases the holding state of the holding circuit, based on the output of the logic detection circuit.

3. The control apparatus for an in-vehicle electric generator, according to claim 2, wherein the occurrence duration t2 of a release pulse generated by the release-pulse generation circuit is set to be longer than a recurrence cycle t1 in which the signal at the external-control-signal input terminal is made to change.

4. The control apparatus for an in-vehicle electric generator, according to claim 1, the hold-release means comprises:
    a frequency detection circuit that detects a fact that the frequency of the signal at the external-control-signal input terminal is higher than a predetermined value; and
    a release-pulse generation circuit that releases the holding state of the holding circuit, based on the output of the frequency detection circuit.

5. The control apparatus for an in-vehicle electric generator, according to claim 4, wherein a detection threshold value t3 for the cycle of the signal, at the external-control-signal input terminal, for generating the release pulse is set to be longer than the cycle t1 of a trigger pulse.

* * * * *